United States Patent [19]
Palozzi et al.

[11] Patent Number: 5,629,863
[45] Date of Patent: May 13, 1997

[54] ADDITIVE BLENDING CONTROLLER

[75] Inventors: Nicola Palozzi, Woodbridge; Andrew M. Kipiniak, Etobicoke, both of Canada

[73] Assignee: 372103 Ontario Ltd., Concord, Canada

[21] Appl. No.: 450,018

[22] Filed: May 25, 1995

Related U.S. Application Data

[63] Continuation of Ser. No. 25,270, Mar. 2, 1993.

[51] Int. Cl.$^6$ .......................... G05D 11/02; G05D 11/13; G06F 17/00
[52] U.S. Cl. .......................... 364/502; 364/173; 364/510; 364/479.09; 222/14; 222/23; 222/57
[58] Field of Search .................... 364/500, 502, 364/509, 510, 478, 479, 571.07, 173, 172; 73/61.43; 222/1, 2, 14, 57, 23, 71, 30, 31

[56] References Cited

U.S. PATENT DOCUMENTS

| | | | |
|---|---|---|---|
| 4,265,266 | 5/1981 | Kierbow et al. | 222/57 X |
| 4,353,482 | 10/1982 | Tomlinson et al. | 364/479 X |
| 4,538,221 | 8/1985 | Crain et al. | 364/172 |
| 4,917,304 | 4/1990 | Mazzei et al. | 239/64 |
| 5,038,971 | 8/1991 | Gayer et al. | 222/1 |
| 5,118,008 | 6/1992 | Williams | 222/1 |
| 5,222,027 | 6/1993 | Williams et al. | 364/479 |
| 5,251,785 | 10/1993 | Hayden et al. | 364/510 X |
| 5,271,526 | 12/1993 | Williams | 222/57 X |

OTHER PUBLICATIONS

*Omni–Pak Chemical Injector*, ADCON, Additive Controls & Measurement Systems, Inc., Owner's Manual No Date.
*Omni–Pak Chemical Injector*, ADCON, Additive Controls & Measurement Systems, Inc., Installations/Operations Manual No Date.
Blend–Pak, Blend–Pak™ Injector . . . From Gate City Equipment Company, Inc., Owner's Manual Jan. 1992.
PAC–3, Programmable Additive Controller, Titan Industries, Inc., Operations/Programming Manual No Date.

*Primary Examiner*—Emanuel T. Voeltz
*Assistant Examiner*—M. Kemper
*Attorney, Agent, or Firm*—Darby & Darby

[57] ABSTRACT

A method for controlling an additive blending process includes determining the volume of main product and blending an amount of additive thereto to obtain a predefined ratio of additive to main product. The method includes the step of creating a non-volatile record of each significant event which occurs during blending operations and includes an extensive error checking and safety regime. A controller for accomplishing this method includes the ability to blend multiple additives simultaneously and with different types of blending systems such as piston injectors and streaming. The controller monitors status signals from the system and removes enabling signals from various components to effect a safe shut down in the event of an error condition being detected.

23 Claims, 12 Drawing Sheets

ADDITIVE BLENDING CONTROLLER

This is a continuation of application Ser. No. 08/025,270, filed Mar. 2, 1993.

FIELD OF THE INVENTION

The present invention relates to additive blending systems. Specifically, the present invention relates to a novel method of controlling an additive blending system and to a novel additive blending controller.

BACKGROUND OF THE INVENTION

In many fields it is necessary to blend additives with a main base product to form a desired finished product. Typically, such additives need to be added to the main base product in precise ratios to obtain the required properties in the finished product. Blending additives at ratios other than a specified ratio is undesired, both because the finished product may not perform to specifications and because many additives are relatively expensive and it is uneconomic to waste additive by exceeding the required ratios.

Non-limiting examples of products which undergo additive blending include: gasoline and jet fuels; lubricants; paints; various food products; fertilizers; and pesticides.

Systems for controlling the blending of additives with a base product at required ratios are known. Such systems typically employ a flow meter which outputs a signal every time a pre-defined amount of main product has passed through the flow meter. In response to that signal, a pre-defined amount of an additive is blended into the main product.

Several different types of blending systems are known, perhaps the most common type employing additive injectors which are piston injectors. These systems inject a pre-determined amount of an additive on each stroke of the piston. In response to a signal from a main product flow meter, the piston injector is stroked to inject a predefined amount of additive.

Another type of blending system is the block valve blending system. In this system a solenoid operated on-off, or block, valve is connected to a pressurized supply of additive. An additive flow meter is connected between the block valve and the main product line and, in response to an 'inject' signal from a flow meter in the main product line, the block valve is opened by a controller, allowing additive to flow through the additive line flow meter and into the main product line. The controller receives signals from the flow meter in the additive line and, when a signal corresponding to a predefined desired amount of additive is received, the controller closes the block valve. Each time the controller receives the inject signal from the flow meter in the main product line the process is repeated.

Yet another type of blending system is injector streaming. In streaming systems, a controller monitors the main product line to determine the rate of flow, i.e. number of gallons per minute, etc. A second flow meter in the additive line allows the controller to determine the flow rate of the additive. The controller operates a variable position valve to adjust the flow of additive into the main product line. For example, if the desired ratio of additive to main product was 10 ounces of additive per each five gallons of main product and the main product is flowing at 40 gallons per minute, the controller opens the variable additive valve until the additive line flow meter outputs a signal indicating a flow rate of 80 ounces of additive per minute.

Controllers for each of the above-mentioned techniques are known and range from hard-wired systems, wherein for example the main product flow meter produces a pulse which directly triggers a piston injector, to more sophisticated systems such as that shown in U.S. Pat. No. 5,118,008 to Williams.

The Williams reference shows a microprocessor based controller which receives signals from a main product flow meter and operates a block valve to supply additive accordingly. The controller counts the pulses received from the additive flow meter and compares the count to a pre-defined value in its memory. When the count equals the pre-defined value, the controller completes the injection cycle by shutting the additive valve.

However, problems and/or disadvantages exist with the prior art systems. Such systems typically are only able to control a single type of injector, such as block injectors or piston injectors. Also, the prior art systems cannot control more than a single additive injection. When blending a product which includes several additives, either multiple controllers are required to be employed, one for each additive, or the product must be blended in several product runs, one run for each additive required. Further, such systems typically require a manual re-configuration of the system for each finished product to be blended, with the ratio of additive to main product being manually adjusted either physically, by changing the flow meters, or electrically by replacing the pre-defined values stored in the controller.

Perhaps even more disadvantageous is the fact that only the most limited error-checking and/or reporting capabilities are provided in the prior art systems. The lack of error checking and reporting capabilities is increasingly becoming of concern, both to meet regulatory requirements and to ensure that products are correctly and economically produced.

SUMMARY OF THE INVENTION

It is an object of the present invention to provide a novel method of controlling an additive blending system.

It is a further object of the present invention to provide a novel controller for an additive blending system.

According to a first aspect of the present invention, there is provided a method of controlling a blending system process comprising the steps of:

(i) defining a desired ratio of an additive to a main product;

(ii) providing a flow of main product;

(iii) measuring the volume of said main product flow;

(iv) adding a predefined amount of at least one additive to said measured main product flow to achieve said desired ratio;

(v) creating a non-volatile record indicating the time, date, amount and type of additive added in step (iv); and (vi) repeating steps (iii) and (v) as necessary until the process is terminated.

Preferably, the method allows the simultaneous or sequential blending of more than one additive, if required, and allows for more than a single type of blending operation to be employed. Also preferably, the method includes error-checking capabilities to ensure proper flow rates and correct operation of the system and further removes enable signals and/or provides inhibit signals to cease operation of the system once an error condition has been detected. Also preferably, the method includes the production of a transaction record of all significant operations conducted by the system, such transaction records being sufficiently detailed to satisfy regulatory requirements.

According to another aspect of the present invention, there is provided a controller for an additive blending system to blend at least one additive to a main product at a predefined ratio, comprising:

main product volume measurement means;

program storage means;

non-volatile memory means;

at least one additive supply control means; and processing means responsive to said main product volume measurement means and operating said additive supply control means to provide a volume of additive to said main product volume to achieve said predefined ratio, said processing means creating a record in said non-volatile memory means including the date and time said additive volume was provided and the volume of additive provided.

Preferably, the controller is easily configurable to control one or more types of blending operations. Also, it is preferred that the controller be able to conduct at least two different additive blending operations at the same time, either sequentially or in parallel, and that the different operations may be effected by different types of blending operations, such as block valve and streaming. Also preferably, the controller includes a non-volatile memory which allows the storage of pre-defined ratios and the additives for two or more finished products.

Also preferably, the controller maintains a record in non-volatile memory of transactions conducted by the controller, including totals of finished product, additives added and time and date of the transactions. Also preferably, the controller includes means to store the operating characteristics of the equipment to which it is attached to minimize 'dribble' or other process variation. Further, it is preferred that the controller be provided with communications capabilities allowing remote access from authorized data communication devices such as microcomputers, etc. and that such remote access includes configuration and reporting functions. It is also preferred that the controller includes a simple to use and easily understood data-entry keypad and digital readout.

BRIEF DESCRIPTION OF THE DRAWINGS

Preferred embodiments of the present invention will now be described, by way of example only, with reference to the attached figures wherein.

DETAILED DESCRIPTION OF THE PREFERRED EMBODIMENTS

Figure 1:
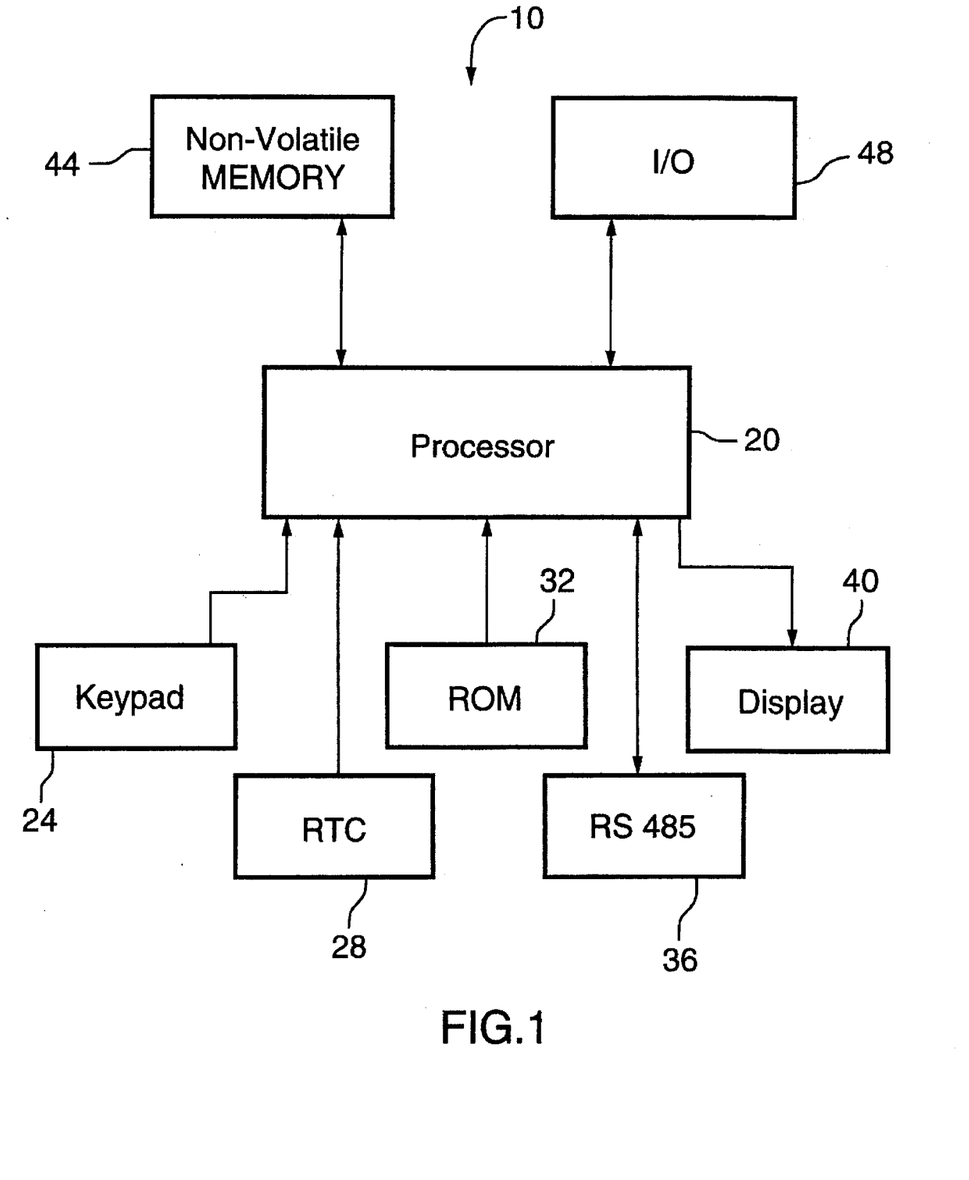
FIG. 1 shows a block diagram of a blending system controller.

Referring now to FIG. 1, a block diagram of a blending system controller in accordance with the present invention is shown. The controller, indicated generally at 10, includes a processor unit 20, a keypad 24, a battery backed-up Real Time Clock (RTC) 28, a program ROM memory 32, an RS485 communications port 36, a display 40, a non-volatile memory 44 and various input and output (I/O) ports 48 as will be described in further detail below.

The above-mentioned components of the controller are commonly available and the present invention is not particularly limited to particular devices. In the preferred embodiment, processor 20 is a Z-80 microprocessor and Real Time Clock 28 is a MK48T08 device manufactured by SGS Thomson Microelectronics. Similarly, in the preferred embodiment, RS485 communications port 36 is a Z84C40 device also manufactured by SGS Thomson Microelectronics. Program ROM 32 may be any suitable ROM, EPROM, EEPROM or similar device and non-volatile memory 44 may be battery backed-up static CMOS RAM devices, or other devices as would be apparent to those of skill in the art.

Figure 2:
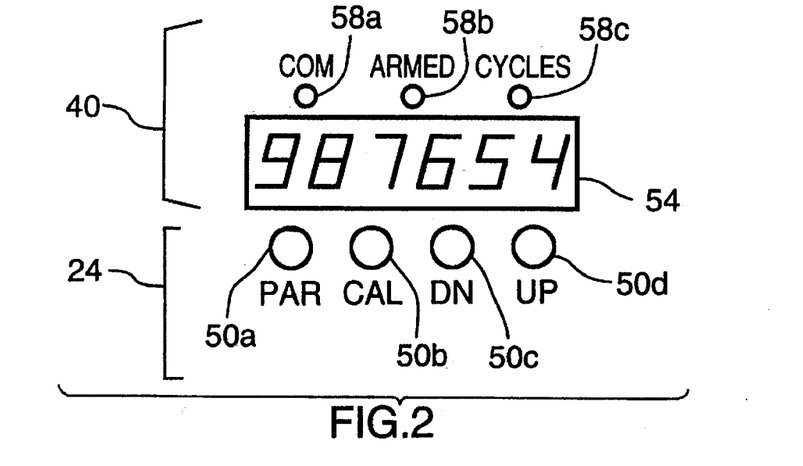
FIG. 2 shows a keyboard and display module for the controller of FIG. 1.

FIG. 2 shows a preferred embodiment of keypad 24 and display 40. In this preferred embodiment, keypad 24 and display 40 are combined into a single integrated module which may be mounted in any convenient place on the injection system. Keypad 24 includes four momentary contact switches, 50a through 50d, as will be described in more detail below, and display 40 includes a six-digit digital display 54 and three status indicators 58a through 58c. Digital Display 54 may be LCD or LED-based or any other suitable type of display as would occur to those of skill in the art and status indicators 58 may be LED, neon, incandescent lamps, or any other suitable indication means as also would occur to those of skill in the art.

Status indicator 58a, the COM indicator, lights when communications are occurring through RS485 port 36. Status indicator 58b, the ARMED indicator, lights when the controller is enabled and is ready to commence blending operations. Finally, status indicator 58c, the CYCLES indicator, lights each time a blending cycle commences. These operations are described in more detail below.

Figure 3:
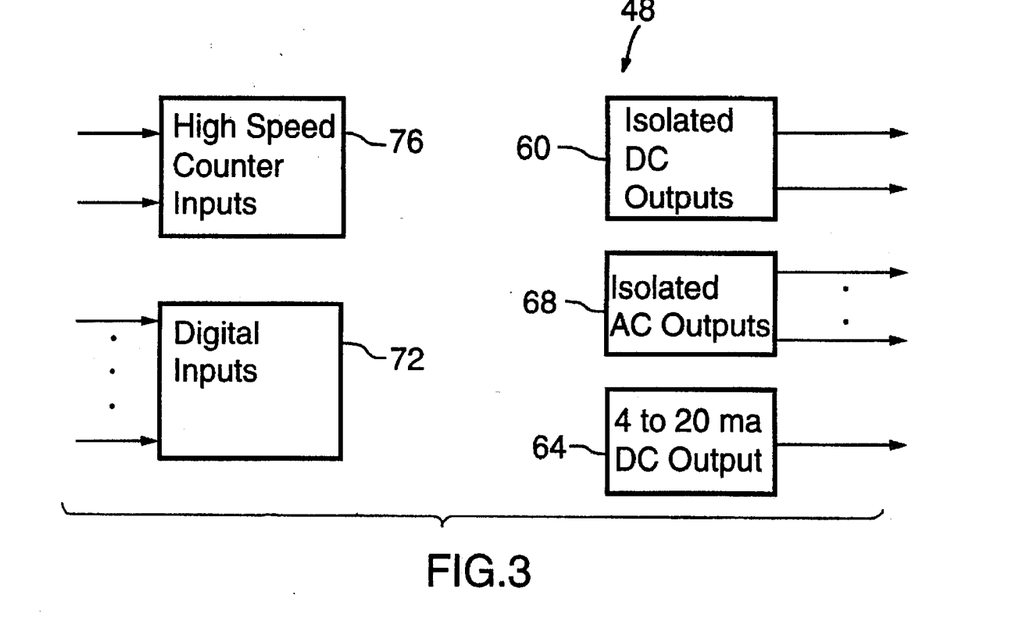
FIG. 3 shows a schematic representation of input and output ports of the controller of FIG. 1.

I/O ports 48 may include many different types of input and output signals, as required for a particular system. The I/O ports of the preferred embodiment, as shown in FIG. 3, include two isolated DC Outputs 60, a four to twenty milliamp variable DC output 64, eight isolated AC Outputs 68, twelve Digital (ON-OFF) Inputs 72, and two High Speed Counter Inputs 76.

Program ROM 32 contains a program which is executed by processor 20 to control blending operations and contains system configuration data, both of which are described in detail below. Non-volatile memory 44 contains several types of information which may be added, deleted or amended as required and each of these types of information is described in turn below.

Controller 10 comprises extensive reporting facilities to address regulatory and user needs. Specifically, as will also be further described below, the occurrence of certain preselected events results in controller 10 creating transaction records in non-volatile memory 44. In the preferred embodiment, non-volatile memory 44 is designed to maintain approximately 500 transaction records in a First In First Out (FIFO) queue. Transaction records may be transferred from the queue to a remote device through RS485 port 36 for either storage or printing out as desired. In the event that a system is contemplated wherein more than 500 transactions may occur between transfers, the size of volatile memory 44 may be increased to provide the desired queue size.

Transaction records are created for events (transactions) such as system power-up, commencement of blending operations, each additive injection, completion of blending operations, occurrence of faults, modification of product ratios, etc. Such transaction records will preferably include the time and date at which the transaction occurred, the type of transaction and any associated data, such as the amount of additive injected or the type of fault which occurred.

Non-volatile memory 44 is also used to store additive information (i.e.—recipes) for various finished products. In the preferred embodiment, non-volatile memory 44 can store information for up to eight different finished products, including up to three additive types and ratios for each product.

Non-volatile memory 44 also stores values for main product flow meter and additive flow meter Meter Factors and Calibration Factors. The Meter Factors are used to establish a rough relationship between the volume of product passing through the flow meter and the number of pulses generated by that meter. The Calibration Factors are used to 'fine tune' the Meter Factors for greater accuracy. For example, a main product flow meter could be specified as producing ten pulses per U.S. gallon and an additive flow meter could be specified as producing fifty pulses per litre.

As will be understood by those of skill in the art, within controller 10, all product definitions and information is represented in generic engineering units and products are defined in terms of the number of units of additive per units of main product. Accordingly, using the Meter Factors given above, if U.S. gallons are selected as the preferred unit, the Meter Factor stored in non-volatile memory 44 for the main product flow meter would be ten and the Meter Factor for the additive flow meter would be one thousand, eight hundred and ninety-two point seven zero five (i.e.—50 pulses per litre times 3.785411 litres per U.S. gallon).

Alternatively, if litres are selected as the preferred unit, the Meter Factor for the main product flow meter would be selected as two point six four one seven and the Meter Factor for the additive flow meter would be fifty. To accommodate the fact that some meters provide a non-integer number of pulses for some desired units (as is apparent from the examples above), the above-mentioned Meter Factors are in fact scaled-up, prior to entry in controller 10, by a factor of one thousand. Thus, in the latter example above, the main product Meter Factor would be two thousand six hundred and forty-two and the additive Meter Factor would be fifty thousand.

The calibration factors for additive flow meters are determined by arranging to receive the flow of additive into a graduated vessel by, for example, moving a three-way valve to a test position, and then depressing momentary contact switch 50b on keypad 24 which is the CALIBRATE switch. Once depressed, controller 10 injects the preselected quantity of additive, as determined in view of the additive meter factor, into the graduated vessel. The preselected volume of additive is divided by the measured volume to determine the calibration factor. This factor is multiplied by ten thousand to allow elimination of the decimal point and is stored in non-volatile memory 44.

As will be apparent to those of skill in the art, if the properties of one or more of the flow meters in the system vary due to changes in flow rate or viscosity, the calibration procedure may be performed again and the calibration factor adjusted accordingly. Further, if any of the flow meters used in the system are subsequently replaced, due to failures or redesign, it is only necessary to adjust the pre-defined Meter Factor and Calibration Factor associated with that flow meter rather than change stored product definitions.

Non-volatile memory 44 also stores various system variables. For example, in a block valve system, a certain amount of additive is present in the additive line between the block valve and the flow meter. When the block valve is closed, the additive remaining in the line 'dribbles' through the additive flow meter increasing the amount of additive injected into the main product flow. Controller 10 monitors the additive flow meter when the block valve is closed and determines the amount of this dribble. A value representing the amount of dribble (the dribble factor) is stored in non-volatile memory 44 and is used by controller 10 to decrease the amount of additive injected prior to the close of the block valve by a like amount. Thus, the sum of the additive injected prior to the block valve closing and the dribble which occurs after the close of the block valve is equal to the predefined required amount of additive. Each additive may have its own dribble factor depending on the physical characteristics of the block valve and flow meter and the additive. Therefore, separate dribble factors are maintained for each additive line and are adjusted on an ongoing basis.

Similarly, an injection offset factor is stored in non-volatile memory 44. This offset factor determines at what point the blending operation is initiated. For example, without an offset (or with an offset of zero), a blending operation occurs when the pulses received from the main product flow meter, after scaling, equal the pre-defined value stored in non-volatile memory 44 for the desired finished product. This pre-defined value represents the volume of main product to which additive should be added. Depending upon several factors, this volume can be several tens of gallons or more.

When a blending operation terminates prior to the above-mentioned pre-defined volume of main product passing through the main product flow meter, either due to normal termination of a finished product run or due to an error condition, the blending operation will not have occurred. Thus, the final volume of main product will have had no additives injected and thus the overall ratio of additives in the finished product will be below that desired. Accordingly, an injection offset can be pre-set to initiate the injection operation after a pre-defined minimum number of pulses have been received from the main product flow meter. In this case, while a pre-defined volume of additive is still injected for the pre-defined volume of main product, the injection operation is commenced prior to the complete pre-defined volume of main product passing through the main product flow meter.

It is contemplated that the offset will normally be equal to one half of the pre-defined number of main product flow meter pulses. In this case, the maximum shortfall in the volume of additive injected is reduced to one half of the volume injected during each injection operation and, on average, should be reduced even lower.

Finally, non-volatile memory 44 contain totals for: the volume of each additive injected; the volume of main product blended; the volume of finished product blended.

These totals are updated by controller 10 during each blending operation.

As is described below, controller 10 also comprises an extensive error checking regime. As part of this regime, the controller receives various status signals from components of the blending system and these status signals are monitored to ensure proper operation of the blending system is occurring. Provided that the status signals indicate that proper operation is occurring, the controller maintains various enable signals to blending system components. If the controller determines that one or more status signals are not nominal, the enable signals are removed in a controlled manner, resulting in the blending system shutting down safely, if possible.

Preferred embodiments of the present invention will now be described with reference to the following examples of representative installations. The configuration of controller 10 for each of the installations discussed below is accomplished by selecting one of a series of pre-defined configurations which are stored in Program ROM 32. It is contemplated that such selection will be effected through hardware switches, such as a DIP (Dual Inline Package) switch located within controller 10, at the time of installing the controller. If the system is altered after installation, the configuration may simply be updated as required by altering the DIP switch settings.

Figure 4:
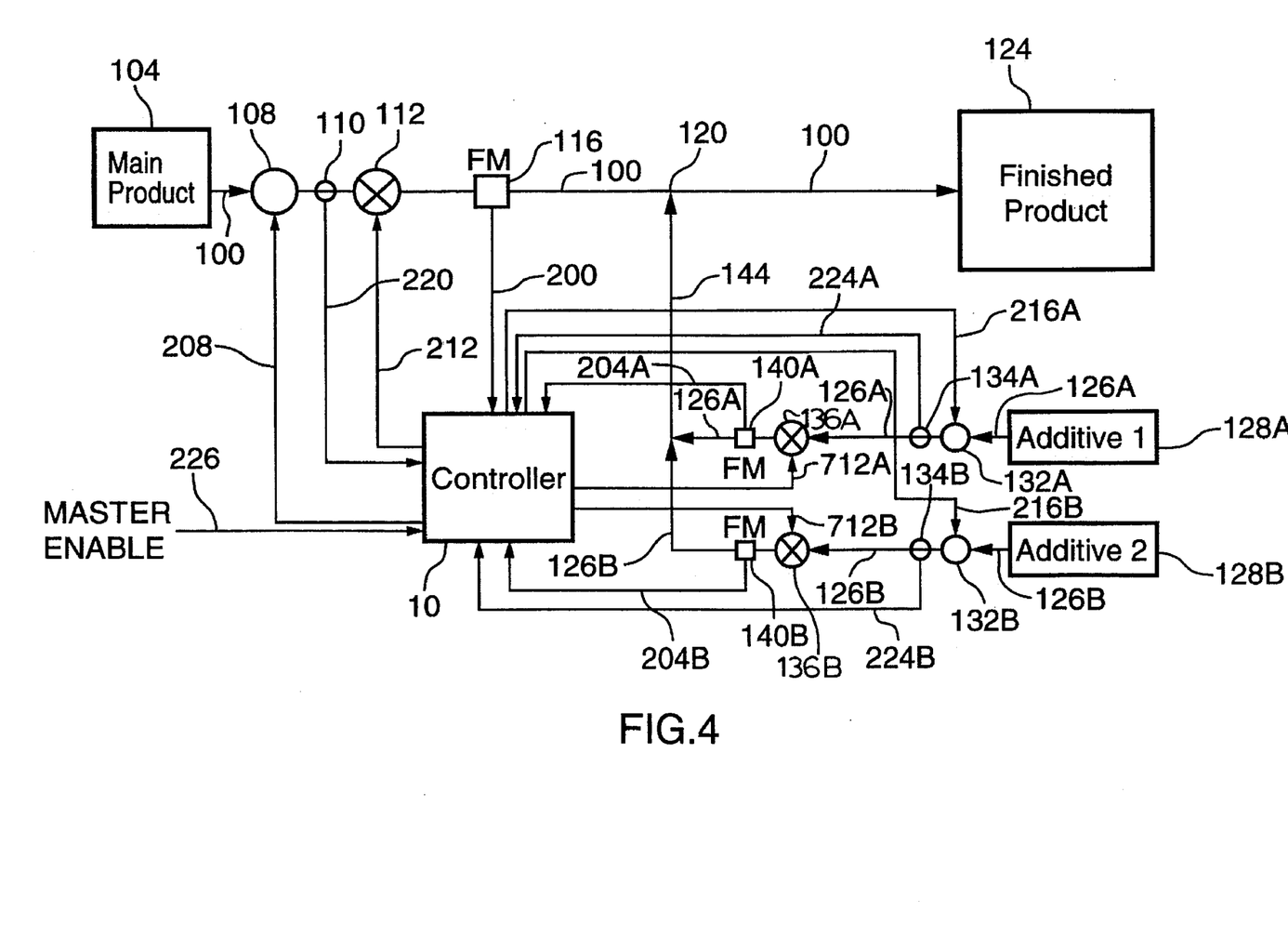
FIG. 4 shows a schematic representation of a blending system employing the controller of FIG. 1.

FIG. 4 shows a schematic representation of the present invention when employed in an additive control system for controlling up to two simultaneous (parallel) additive blending operations. Such a system may be employed, for example, in blending jet engine fuels wherein an identification dye and a vaporization enhancer may be added to the fuel.

The main product line 100 of the system includes a main product supply 104, main product pump 108, main product pressure sensor 110, main product control valve 112, main product flow meter 116, additives injection point 120 and finished product storage 124. Each additive line 126 of the system includes an additive supply 128, an additive pump 132, an additive pressure sensor 134, a block valve 136, a flow meter 140 and injection line 144. Injection line 144 feeds into injection point 120 on main product line 120 at a point upstream of the finished product storage 124. In this manner, adequate mixing of the additives and main product is ensured prior to their entry into the finished product storage 124.

It should be understood that finished product storage 124 can be any suitable product storage device, including a holding tank, transport truck, pipeline, packaging machine, or any other suitable device as would be apparent to one of skill in the art, It should also be understood that while FIG. 4 shows a controller capable of two simultaneous blending operations, the present invention is not limited to systems employing two simultaneous blending operations and in fact in many circumstances it is contemplated that the number of desired blending operations may vary from one to four or more.

Main product flow meter 116 includes a signal line 200 which is connected to one of High Speed Counter inputs 76 of controller 10. Similarly, each additive flow meter 140A, 140B includes a signal line 204A, 204B which are each connected to one of Digital inputs 72 of controller 10.

As mentioned above, controller 10 comprises an extensive error checking regime. As part of this regime, several status signals are provided to controller 10. Main product pressure sensor 110 provides a status signal 220 to controller 10 and each additive pressure sensor 134A, 134B provides a status signal 224A, 224B to controller 10. Each of the above-mentioned status signals is connected to one of Digital inputs 72. Further a Master Enable signal 226 is provided to controller 10 to indicate that operation of the blending system is correctly authorized. Master Enable signal 226 can be provided, for example, from a limited access remote terminal through RS485 port 36 or from a key operated switch connected to one of Digital inputs 72.

Controller 10 provides several enable signals to components of the blending system as part of the error checking regime. For example, main product pump 108 receives an Enable signal 208 from one of Isolated AC Outputs 68 on controller 10 and main product control valve 112 receives an Enable signal 212 from another of Isolated AC Outputs 68. In a similar manner, each additive pump 132A, 132B receives an enable signal 216A, 216B from another of Isolated AC Outputs 68.

Product configuration commands may be received from keypad 24 or from RS485 port 36 through a remote terminal to select one of the eight finished products stored in non-volatile memory 44 or to change the stored information for a particular product.

When selected from keypad 24, momentary contact switch 50a, which is the PARAMETER switch, is pressed. This causes display 40 to display a parameter identification number in the three leftmost digits. In the preferred embodiment there are 90 parameters available, although not all are used in most configurations. The user repeatedly presses either momentary contact switch 50c, which is the DOWN switch, or momentary contact switch 50d which is the UP switch until the parameter identification number for the current product is displayed. For example, parameter 31 may represent the recipe for a first stored finished product definition. When the correct parameter number is displayed, the user presses the CALIBRATE switch and display 40 alters to show the current contents of the selected parameter. The contents of the parameter may then be altered as required by pressing the UP or DOWN buttons. When the alterations are complete, the user again presses the CALIBRATE button to complete the entry.

This process may be used to alter the stored recipes, the currently selected finished product, and to display accounting totals maintained by the system. In the latter case, the parameter representing the desired total is selected as above but the system will only display the total and will not allow the user to modify it. Modification of accounting totals requires either changing the above-mentioned configuration DIP switches to a special mode or the provision of a special command through RS485 port 36.

It is contemplated that, in the preferred embodiment, selecting or altering the stored information for a finished product will also result in controller 10 generating a transaction record in non-volatile memory 44. Once the system has been correctly configured, by selecting a pre-defined finished product or by defining a new finished product, blending operations may proceed. The operation of the system shown in FIG. 4 will now be explained with reference to the flow charts of FIGS. 5 and 6.

Figure 5A:
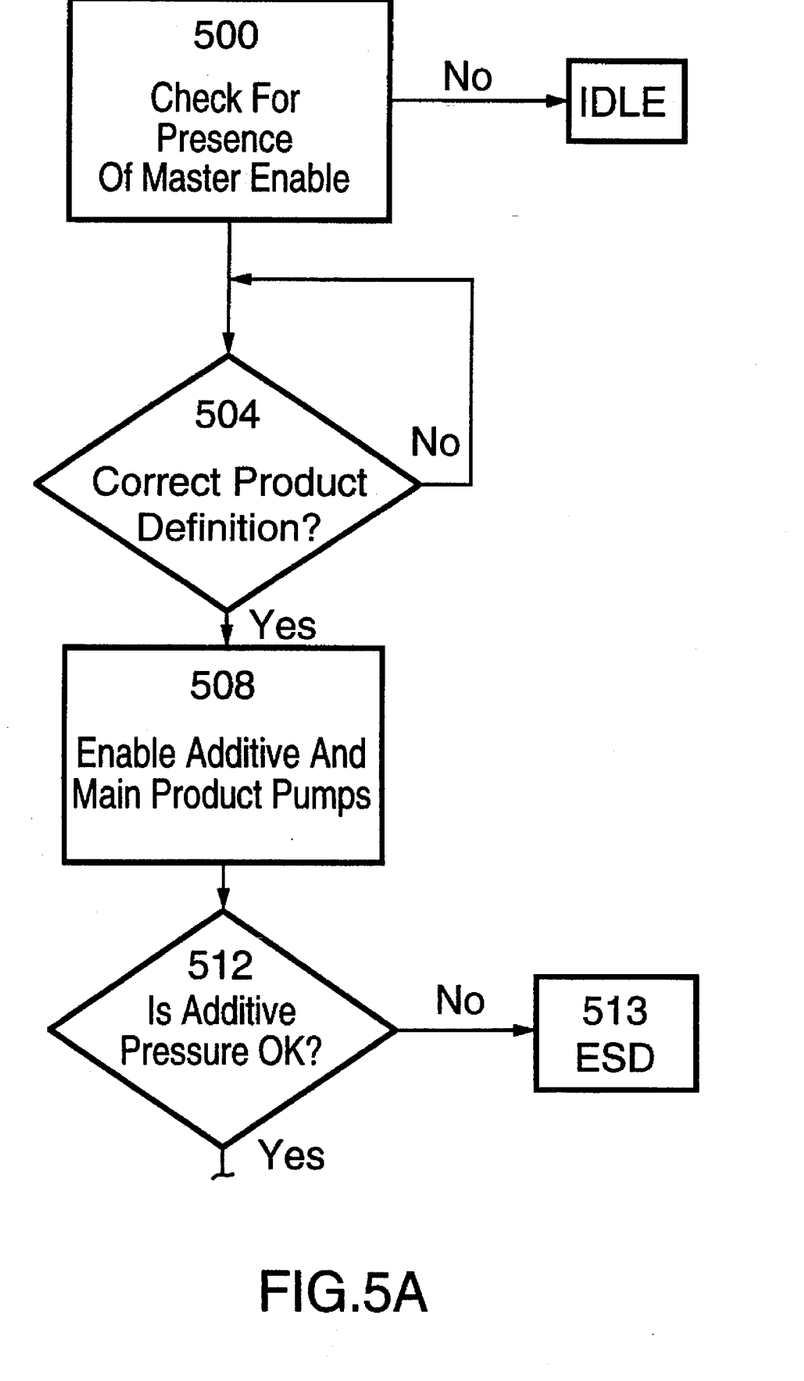
FIG. 5 shows a flow chart of the initialization steps of the controller in the system of FIG. 4.
Figure 5B:
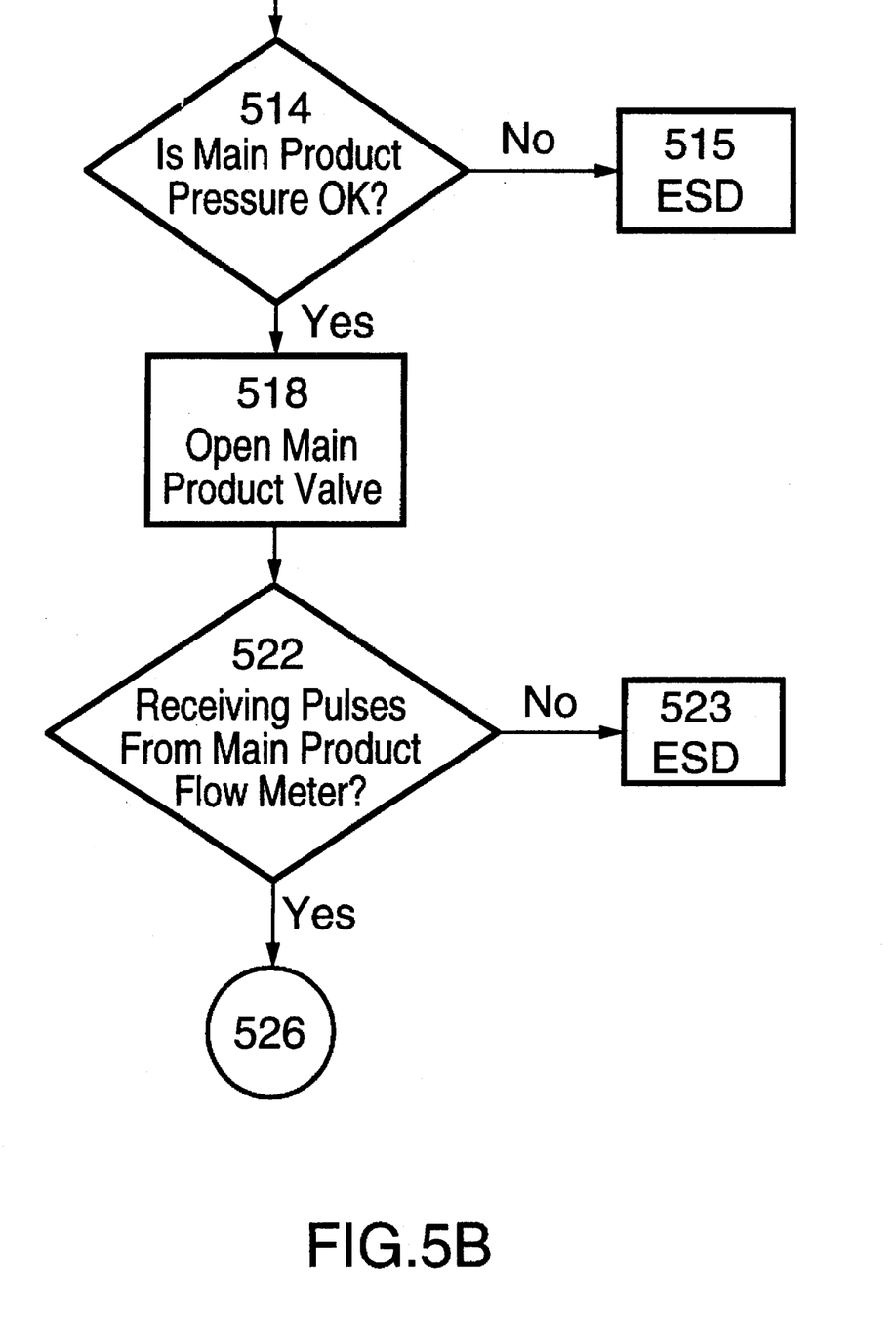

First, at block 500, the controller ensures that Master Enable signal 226 is present which indicates that use of the system is properly authorized. A transaction record is created and stored in non-volatile memory 44 indicating the time and date of the receipt of the Master Enable signal. If Master Enable signal 226 is not present, controller 10 remains in an IDLE state and no further steps occur until it is provided. In fact, as will be understood by those of skill in the art, the presence of Master Enable signal 226 is checked in real time (i.e.—interrupt-driven) such that controller 10 may substantially immediately react to its removal at any time. Depending upon the current state of the blending operations, the removal of Master Enable signal 226 may result in the controller returning to the IDLE state or may result in an Emergency Shut Down, as is described below.

Next, at block 504, the controller performs an internal check to ensure that a finished product has been properly selected and that the definition thereof is consistent. If no finished product has been selected the controller waits for such a selection to occur, otherwise a transaction record is created indicating the finished product which is selected. As shown at block 508, enable signals are next provided to each additive pump 132 which is required to make the selected finished product and to main product pump 108. A transaction record is created indicating the enablement of the pumps.

Controller 10 then checks pressure sensor 134 for each required additive supply to ensure that additive is being correctly provided, as indicated at block 512. If an incorrect status signal is received from pressure sensor 134 for one or more required additives, the controller proceeds to an emergency shut-down (ESD) as indicated at block 513. Otherwise, controller 10 next checks main product pressure sensor 110 to ensure that main product is being correctly provided, as indicated at block 514. Again, if an incorrect status signal is received from pressure sensor 110, the controller executes an emergency shut down as indicated at block 515.

At block 518, the controller is ready to commence blending operations once main product control valve 112 is opened. Depending upon the particular implementation employed, the main product control valve 112 may be opened by controller 10 once block 518 is reached, or when used at locations such as a truck keylock station, etc., it may be opened by an operator-activated switch.

As indicated at block 522, when main product control valve 112 is opened, a main product timer starts running and if controller 10 does not receive signal pulses from main product flow meter 116 within a predefined time span, the controller proceeds to an emergency shut-down as indicated at block 523. This pre-defined time span is another system variable which is stored in non-volatile memory 44 and may be altered depending upon the main product's characteristics as well as those of the main product flow meter. Provided that signal pulses are received at the controller within the predefined time span, blending operations commence as indicated at connector 526.

As will be understood by those of skill in the art, many of the operations described above are conducted on a Real Time (interrupt-driven) basis. For example, as mentioned above, if the Master Enable signal is removed at any point during blending operations the controller will respond by entering the IDLE state or by executing an emergency shut-down depending upon the status of the blending operations. Similarly, if at any time during blending operations the pressure reported by additive pressure sensor 134 drops below a predefined minimum, controller 10 executes an emergency shutdown. Also, if at any time during blending operations controller 10 ceases to receive signal pulses from main product flow meter 116 for more than the pre-defined time span, controller 10 executes an emergency shutdown. Finally, if at any time controller 10 ceases to receive the correct signal from main product pressure sensor 110, an emergency shut down will be executed.

Figure 6A:
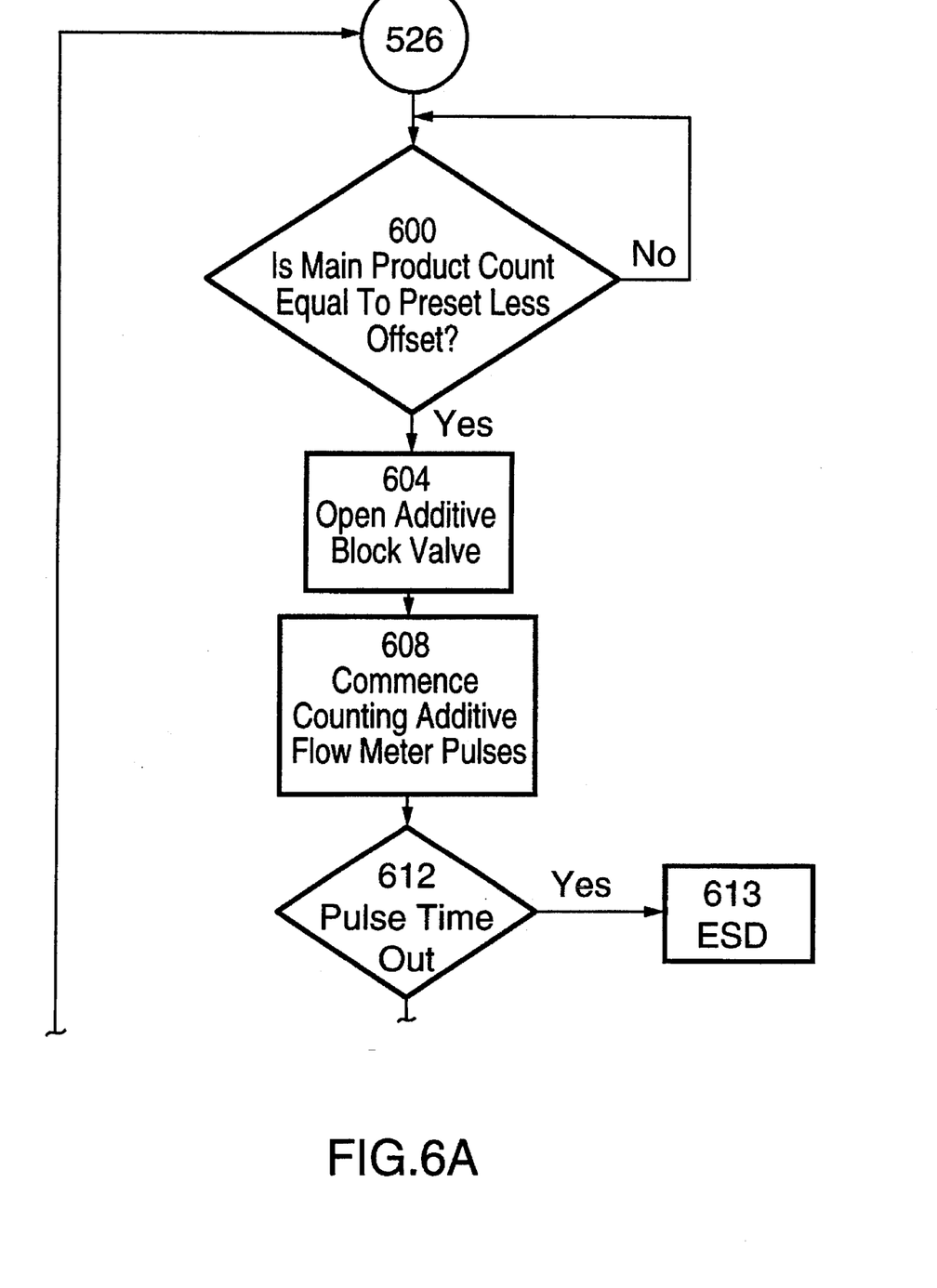
FIG. 6 shows a flow chart of the blending operations of the system of FIG. 4.
Figure 6B:
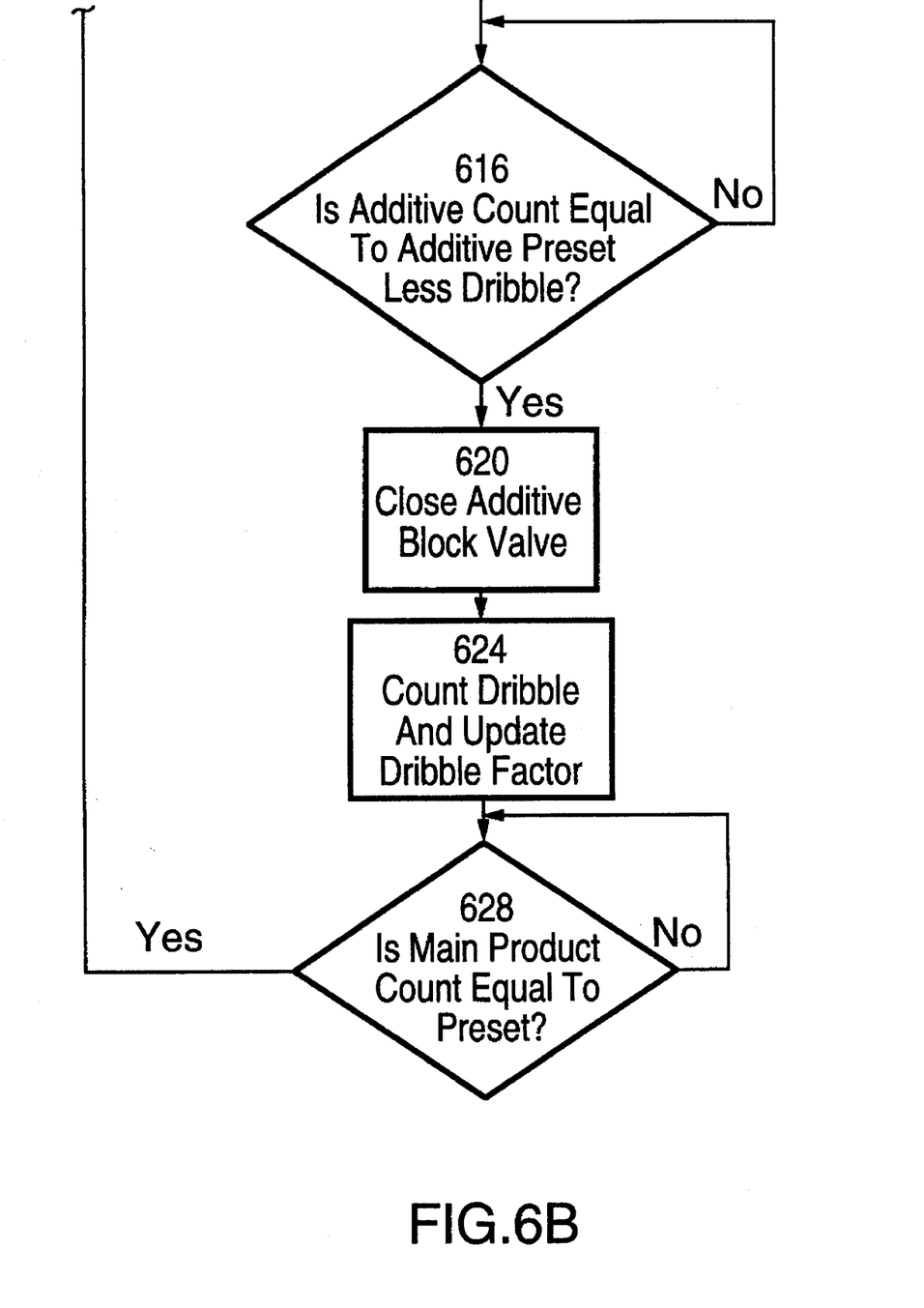

FIG. 6 indicates the steps in the blending operations from connector 526. As shown at block 600, controller 10 counts and scales the pulses received from main product flow meter 116 until the count is equal to the pre-defined scaled value representing the desired volume of main product less the injection offset, if any.

Additive block valve 136 is then opened at block 604 and controller 10 commences counting pulses from additive flow meter 140 at block 608. If pulses are not received from additive flow meter 140 within a pre-defined time span, as indicated at block 612, controller 10 executes an emergency shut down at block 613

At block 616, the controller compares the scaled total of the pulses received from the additive flow meter with the pre-defined scaled value representing the desired volume of additive which is stored in non-volatile memory 44 less the dribble factor, if any. If the scaled total of the pulses equals the pre-defined value, the additive block valve is closed as indicated at block 620 and the controller checks the actual dribble factor for the additive block valve and updates the value stored in non-volatile memory 44 if required, as indicated at block 624.

Finally, as indicated at block 628, controller 10 continues counting and scaling main product flow pulses throughout the blending operation until the scaled count is equal to the pre-defined scaled value in non-volatile memory 44. At this point, controller 10 resets the main product counter and the blending operation restarts at block 600.

While the discussion above refers to a single additive flow meter and block valve, it will be apparent to those of skill in the art that two or more additives may be similarly injected, either in parallel or serially, if desired. The operations indicated by blocks 604 through 624 are conducted for each additive to be blended as will be apparent to those of skill in the art.

Figure 7:
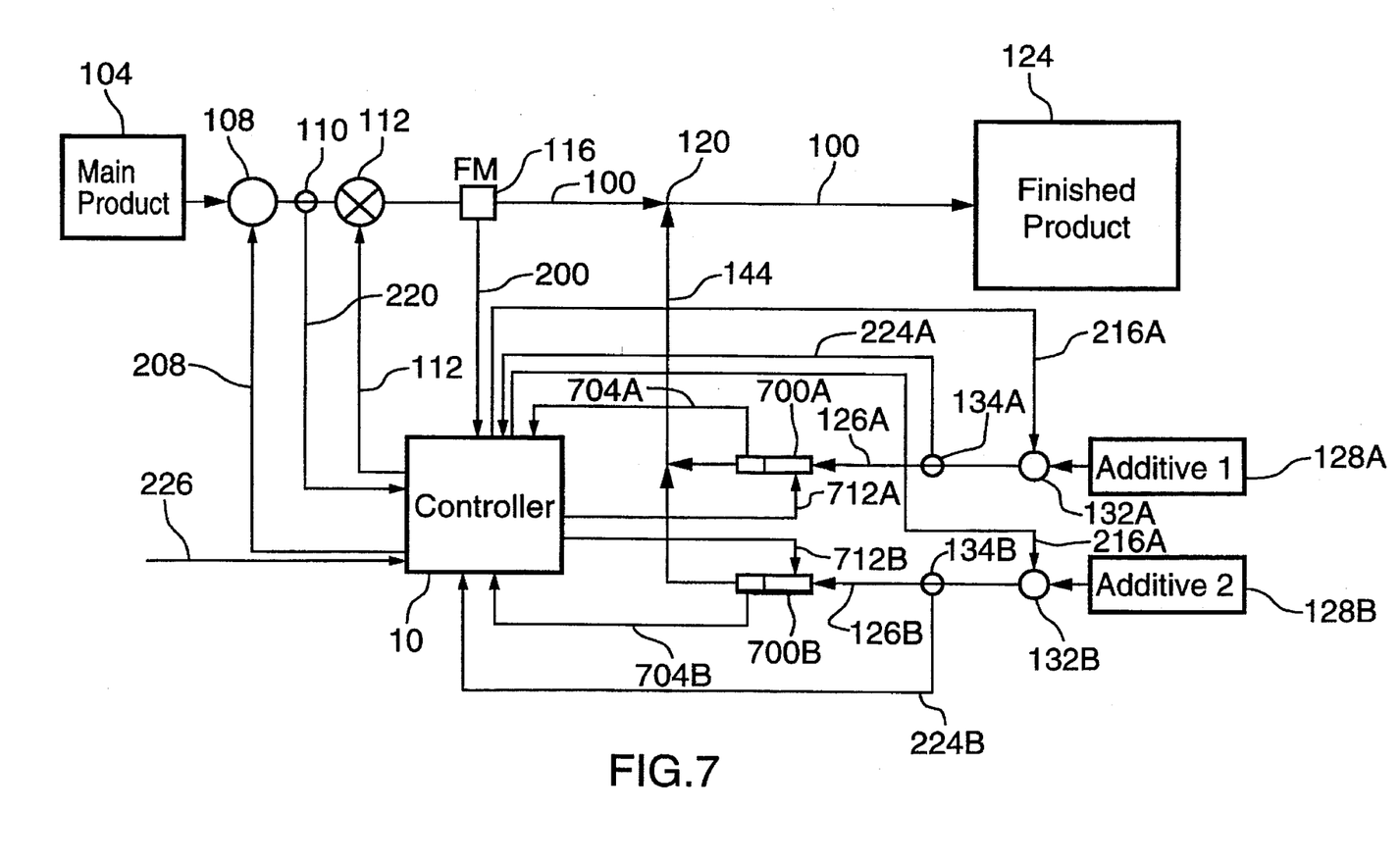
FIG. 7 shows a schematic representation of another blending system employing the controller of FIG. 1.

FIG. 7 shows a schematic representation of a another blending system in accordance with the present invention, wherein similar components to those of FIG. 4 are identified with the same reference numbers.

In this embodiment, the additive block valves and flow meters of the previous embodiment have been replaced with piston injectors 700. These piston injectors are preferably bidirectional but may be uni-directional as would be apparent to those of skill in the art. Each injector 700 includes an injection confirmation signal line 704 which provides a signal to controller 10 confirming that each injection has in fact occurred. Each injector receives its inject signal from controller 10 through injector control line 712.

The operation of this embodiment is similar to that of the previous embodiment discussed above. Essentially, the operations shown in the flowchart of FIG. 5 for the previous embodiment are the same for this embodiment, with only the blending operations (indicated at connector 526 of FIG. 5) being significantly different. The blending operations of this embodiment will now be described with reference to the flow chart of FIG. 8.

Figure 8:
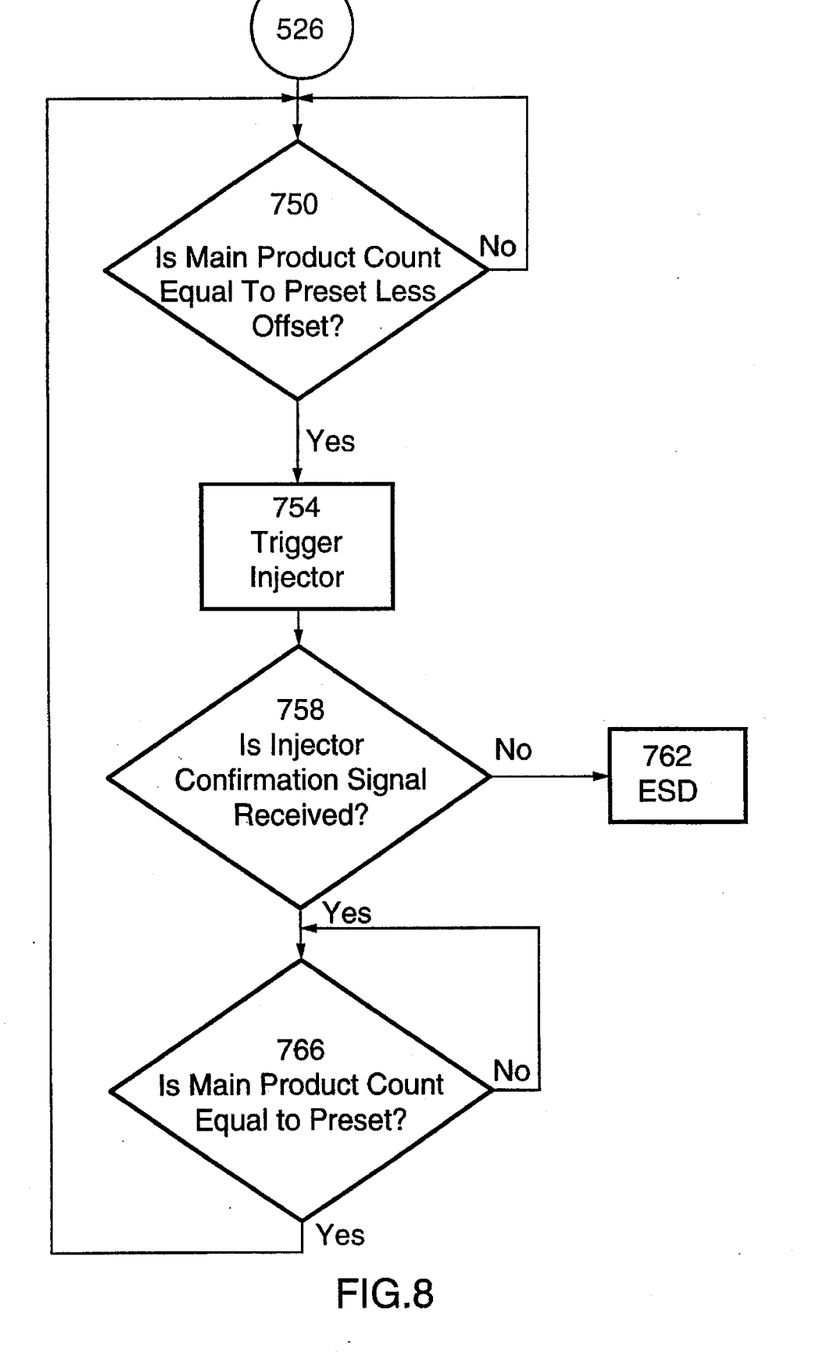
FIG. 8 shows a flow chart of the blending operations of the system of FIG. 7.

As indicated at block 750, controller 10 receives pulses from main product flow meter 116 and counts and scales the pulses until the scaled count equals the preset value less an offset, if any. When the scaled count equals the preset less the offset, controller 10 initiates an injection operation by asserting the injector signal through injector control line 712, as shown at box 754 and a transaction record is created. Controller 10 checks the status of injector confirmation signal on line 704 to ensure that the additive was in fact injected, as indicated at box 758. If the injection confirmation signal is not present, controller 10 executes an emergency shutdown as indicated at box 762 and creates an appropriate transaction record. As indicated at box 766, if the injection confirmation signal is present, controller 10 continues to count and scale the main product pulses until the preset value is reached, at which time the cycle repeats.

Figure 9:
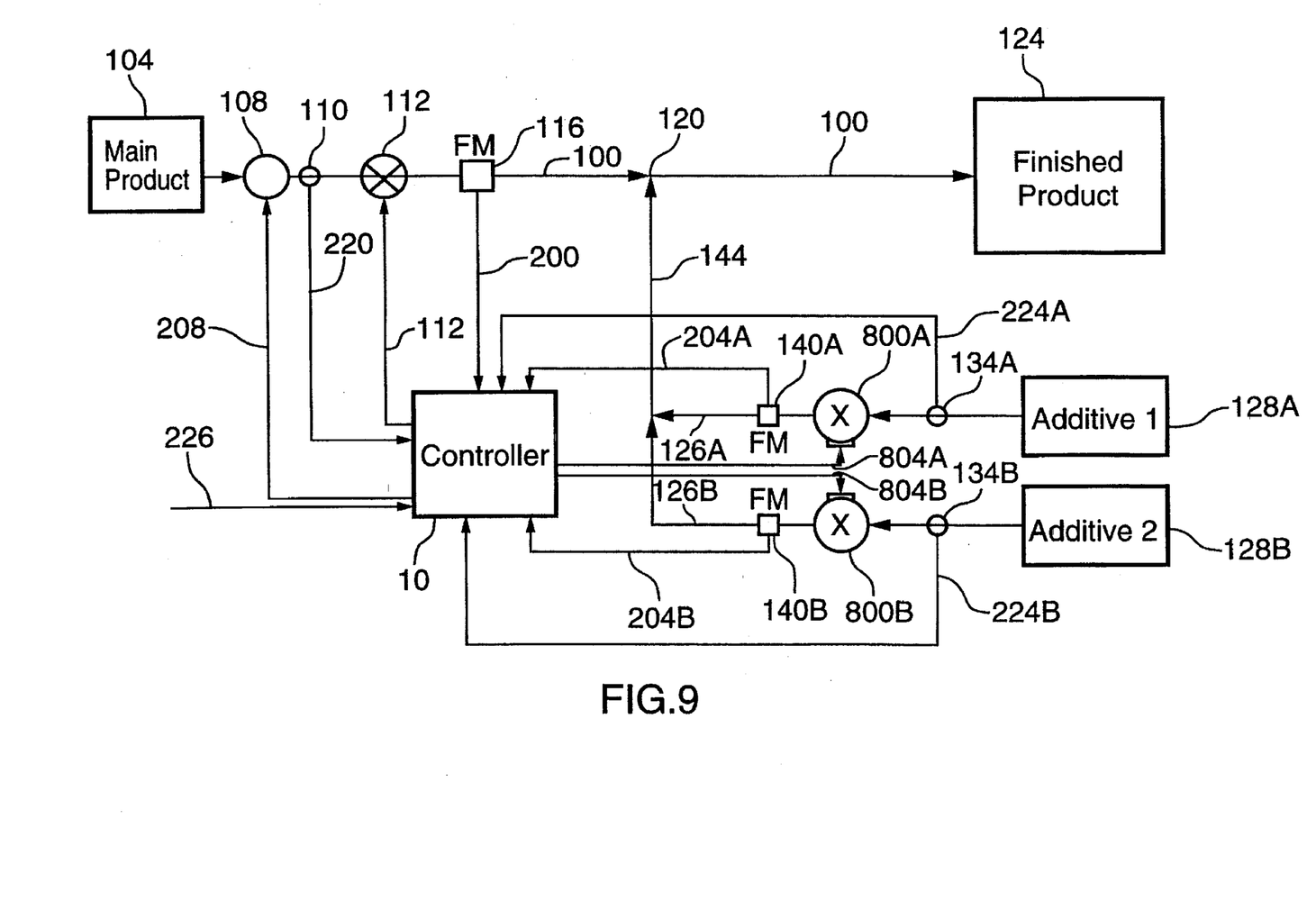
FIG. 9 shows a schematic representation of another blending system employing the controller of FIG. 1.

FIG. 9 shows a schematic representation of a another blending system in accordance with the present invention, wherein similar components to those of FIG. 4 are identified with the same reference numbers.

In this embodiment, which is particularly suited for streaming-type operations, the additive block valves and flow meters of the embodiment of FIG. 4 have been replaced with variable flow rate valves 800. Valves 800 open and close in proportion to the DC current level in valve control line 804.

Again, the operation of this embodiment is similar to that of the embodiment of FIG. 4, discussed above. Essentially, the operations shown in the flowchart of FIG. 5 for the embodiment of FIG. 4 are the same for this embodiment, with the only the blending operations (indicated at box 526 of FIG. 5) being significantly different. The blending operations of this embodiment will now be described with reference to the flow chart of FIG. 10.

In this configuration, non-volatile memory 44 further contains an initial value for the DC current on control line 804, which represents the position to which additive valve 800 is initially opened. Further, non-volatile memory 44 contains a ratio of scaled additive pulses to scaled main product pulses for each additive, a variation value below which errors in additive ratios are not corrected and a step value which represents the incremental change made to additive valve positions.

Figure 10:
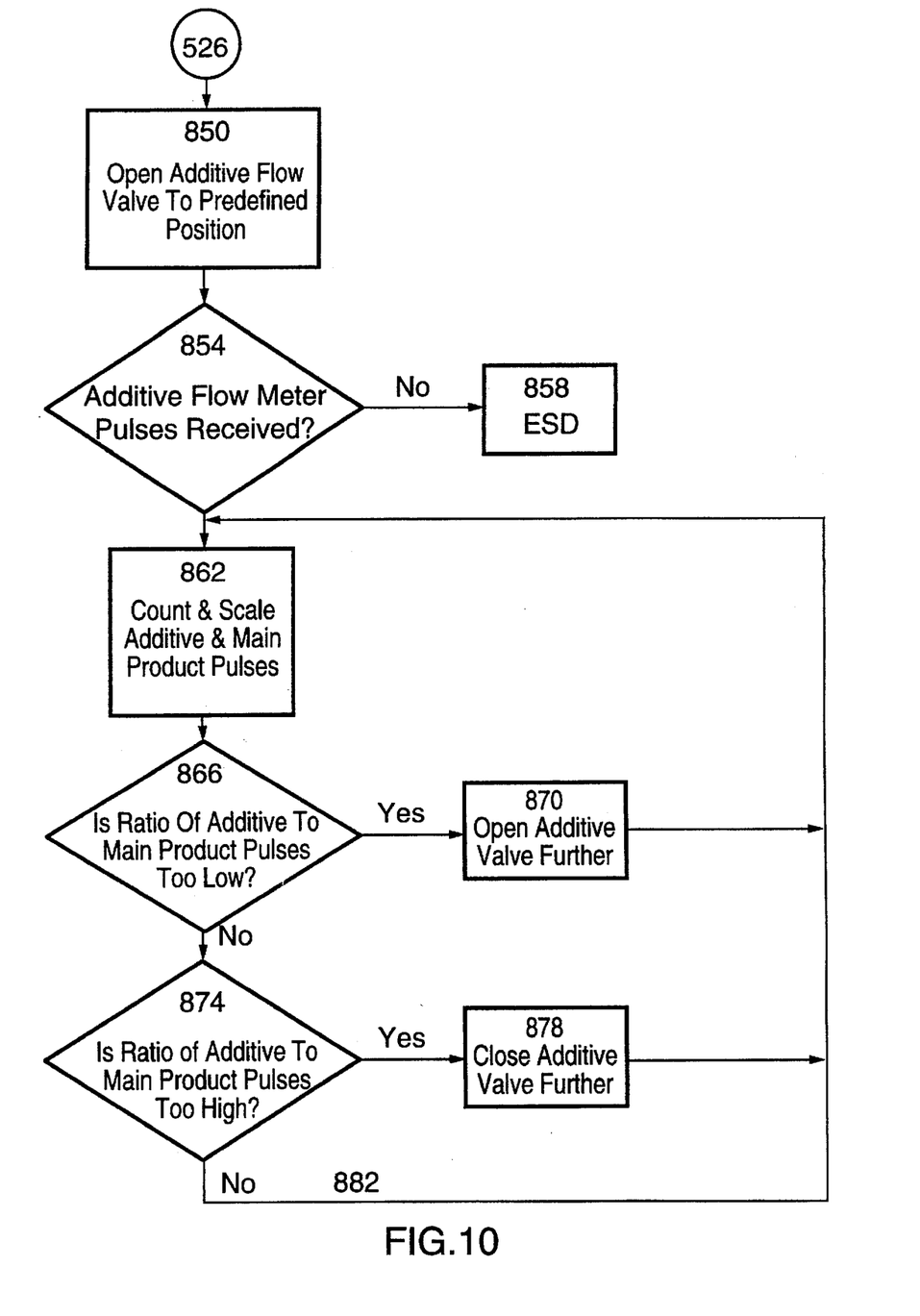
FIG. 10 shows a flow chart of the blending operations of the system of FIG. 7.

As indicated at box 850, blending operations commence with controller 10 opening the additive flow valve to the predefined initial position. Controller 10 then checks to ensure that pulses are being received from additive flow meter 140 at box 854. If pulses are not received, controller 10 executes an emergency shut-down as indicated at box 858. Providing that pulses are being received, controller 10 counts and scales the pulses from additive flow meter 140 and main product flow meter 116 for a pre-defined time period and calculates a ratio therebetween as indicated at box 862. The calculated ratio is compared to the predefined value at box 866. If the ratio is lower than the predefined value by more than the variation value, the dc current to additive flow valve 800 is increased by the predefined step value as shown at box 870 and the blending cycle continues at box 862.

Alternatively, if the ratio is higher than the predefined value by more than the predefined variation value, as indicated at box 874, the DC current to additive valve flow valve 800 is decreased by the predefined step value at box 878 and the blending cycle continues at box 862. Otherwise, if the ratio differs from the predefined value by less than the predefined variation value, as indicated at branch 882, the blending cycle continues at box 862 with no change in the position of additive flow valve 800.

In a more preferred embodiment, as will be apparent to those of skill in the art, non-volatile memory 44 contains a lookup table of step values for use at boxes 866 and 874, with large step values being employed for large ratio differences and small step values being indicated for small ratio differences. In this manner, it is contemplated that better overall blending ratios will be obtained.

Figure 11:
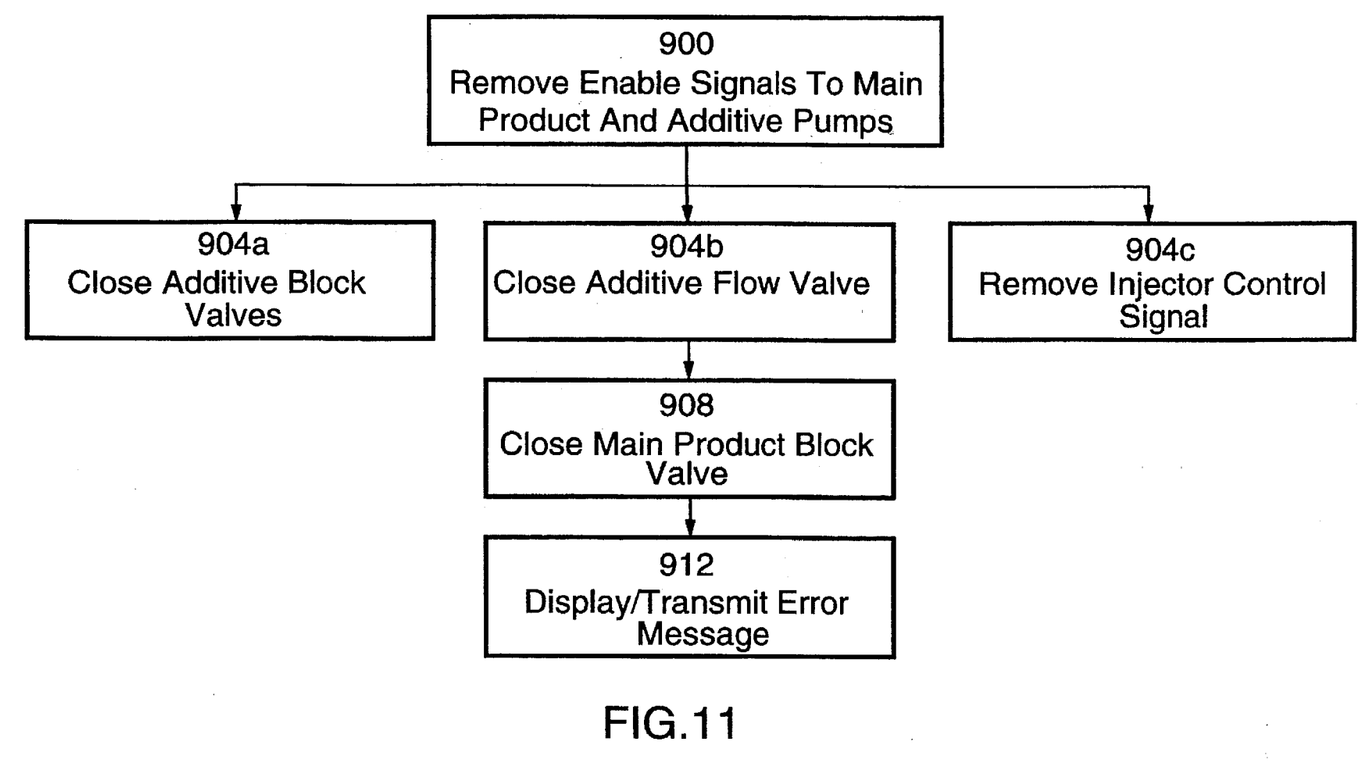
FIG. 11 shows a flow chart of an Emergency Shut Down procedure.

The Emergency Shut Down procedure, referred to above, is now described, with reference to the flowchart shown in FIG. 11. As indicated at box 900, first the Enable signals are removed from additive pumps 132 and main product pump 108. Next, depending upon the current configuration of the blending system, either additive block valves 136 are closed (box 904a) or additive flow valves 800 are closed (box 904b) or injector control signal 712 is removed from injectors 700 (box 904c). Next, as indicated at box 908, main product block valve 112 is closed. Finally, an indicative error message is displayed on display 40 and/or is transmitted through RS485 port 36 as shown at box 912. Of course, a transaction record is also created indicating the source of the error condition.

It will be apparent to those of skill in the art that one or more of the above-described blending systems can be combined as required. For example, a controller in accordance with the present invention may be used with a system comprising a flow meter and block valve additive line and a piston injector additive line. Similarly, a system comprising a piston injector additive line and a streaming additive line may be employed, or any combination of the above-described systems as may be required. As will be apparent to those of skill in the art, any such a combination system will operate with the appropriate blending operations (as shown in FIGS. 6, 8 and 10) occurring simultaneously, in series or in parallel.

It will be understood that, while specific preferred embodiments have been described above, variations will be apparent to those of skill in the art and should not be considered as departing from the scope of the present invention as defined in the claims appended hereto.

We claim:

1. A method of controlling a blending system process, including the addition of at least two different additives, comprising the steps of:

(i) defining in an additive controller desired ratios of at least two additives to a main product;

(ii) providing a flow of main product;

(iii) measuring the volume of said main product flow and determining when a user defined volume of main product flow has occurred, said user-defined volume being less than a pre-selected volume;

(iv) adding predefined amounts of each of said at least two additives to said measured main product flow to substantially achieve said desired ratio of each of said at least two additives to said main product after said user-defined amount has occurred;

(v) creating a non-volatile record in said additive controller indicating the time, date, amount and type of each of said at least two additives added in step (iv); and (vi) repeating steps (iii) and (v) as necessary until the process is terminated.

2. The method of claim 1 wherein step (iii) further includes the step of updating a total representing the total measured flow of said main product.

3. The method of claim 1 wherein, for at least one additive of said at least two additives, step (iv) comprises the steps of:

(i) opening a block valve;

(ii) measuring the flow of said at least one additive through said block valve;

(iii) closing said block valve when the measured flow of said at least one additive equals said predefined amount of said at least one additive.

4. The method of claim 1 wherein, for at least one additive of said at least two additives, step (iv) comprises the steps of:

(i) opening a block valve;

(ii) measuring the flow of said at least one additive through said block valve;

(iii) closing said block valve when the measured flow of said at least one additive equals said predefined amount of said at least one additive, less a stored dribble volume representing the volume of dribble of said at least one additive occurring after said block valve is closed; and (iv) measuring the actual dribble volume of said at least one additive added to said main product after said block valve is closed and updating said stored dribble volume for said at least one additive to said actual dribble volume.

5. The method of claim 1 wherein step (iii) further includes determining when a pre-selected volume of main product flow has occurred and step (iv) occurs prior to said pre-selected volume of main product flow having occurred.

6. The method of claim 1 wherein said at least two additives are added substantially simultaneously.

7. The method of claim 1 wherein said at least two additives are added serially.

8. The method of claim 1 further comprising the step of monitoring the steps of the process and terminating said process upon detecting one or more predefined errors in said monitored steps.

9. The method of claim 8 wherein upon terminating said process a non-volatile record is created indicating the date, time and one or more errors leading to said termination.

10. The method of claim 1 wherein for at least one additive step (iv) comprises the steps of:

(i) opening a variable position valve to a first position to allow flow of said at least one additive into said main product;

(ii) measuring the flow of said at least one additive through said variable position valve to determine a flow rate;

(iii) comparing said flow of said at least one additive through said variable position valve with said measured main product flow to determine the ratio of said at least one additive to said main product; and (iv) adjusting the position of said variable position valve to increase flow of said at least one additive if said determined ratio is less than said desired ratio and to decrease the flow of said at least one additive if said determined ratio is greater than said desired ratio.

11. The method of claim 10 wherein the amount of adjustment of said position of said variable position valve is selected from a predefined range of adjustments corresponding to the degree of difference between said desired ratio and said determined ratio.

12. A controller for an additive blending system including at least two additives which are blended to a main product, each additive having a predefined ratio at which it is blended, comprising:

main product volume measurement means;

program storage means;

non-volatile memory means;

at least two additive supply control means each operable to supply a different one of said at least two additives; and processing means operable in accordance with a program stored in said program storage means and responsive to said main product volume measurement means and operating each of said at least two additive supply control means to provide a volume of each of said at least two additives to said main product volume to achieve each said predefined ratio, each volume of said at least two additives being provided to said main product volume after at least two respective user-defined volumes of main product have been measured by said main product volume measurement means, said processing means creating a record in said non-volatile memory means including the date and time each of said at least two additive volumes were provided and the volume of each of said at least two additives provided.

13. The controller of claim 12 wherein said processing means maintains totals in said non-volatile memory, said totals representing the total volume of main product processed and the total volume of each of said at least two additives provided.

14. The controller of claim 13 further including:

a telecommunications port; and a data-entry means, wherein each of said predefined ratios is provided from either of said telecommunications port and said data-entry means.

15. The controller of claim 14 further including a data-display means wherein said totals may be displayed on said data-display means in response to commands received from said data-entry means and said totals may be transmitted from said telecommunications port in response to commands received therefrom.

16. The controller of claim 12 wherein at least one of said at least two additive supply control means comprises an additive volume measuring means and an additive supply valve, said processing means operating said additive supply valve in response to signals received from said additive volume measuring means to supply a first additive.

17. The controller of claim 12 wherein at least one of said at least two additive supply control means comprises an additive injector, said processor means operating said additive injector to provide a predefined volume of a first additive.

18. The controller of claim 16 wherein the other of said at least two additive supply control means comprises an additive injector, said processing means operating said additive injector to provide a predefined amount of a second additive.

19. The controller of claim 17 wherein the other of said at least two additive supply control means comprises an additive volume measuring means and an additive supply valve to supply a second additive, said processing means operating said additive supply valve in response to signals received from said additive measuring means.

20. The controller of claim 16 wherein said additive supply valve is a variable position valve.

21. The controller of claim 20 wherein said program storage means further comprises a table corresponding to ranges of differences between the measured ratio of said first additive and said main product and said predefined ratio for said first additive and said main product and to positions of said variable position valve, said processing means determining the difference between said measured ratio and said predefined ratio and placing said variable position valve in the predefined position in said table corresponding to said difference.

22. The controller of claim 19 wherein said additive supply valve is a variable position valve.

23. The controller of claim 22 wherein said program storage means further comprises a table corresponding to ranges of differences between the measured ratio of said second additive and said main product and said predefined ratio for said second additive and said main product and to positions of said variable position valve, said processing means determining the difference between said measured ratio and said predefined ratio and placing said variable ratio valve in the predefined position in said table corresponding to said difference.

* * * * *